Aug. 1, 1950 — A. I. THOMPSON — 2,517,053
INSULATED THERMOCOUPLE UTILIZING AN ANODIZED SURFACE
Filed July 10, 1945
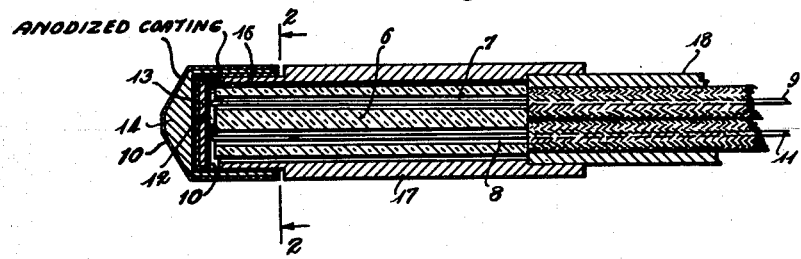
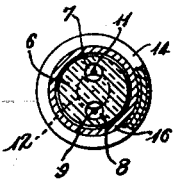
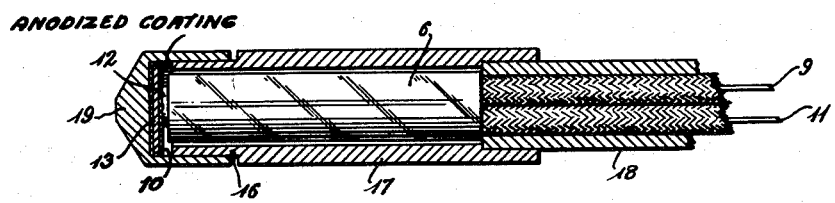
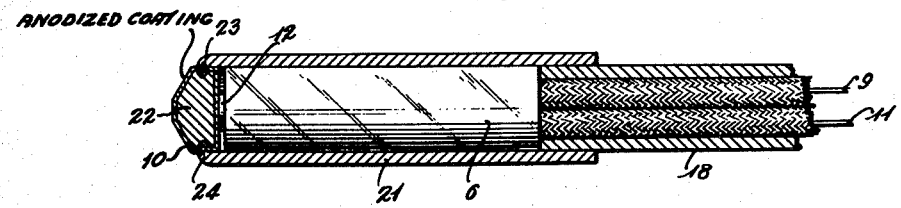
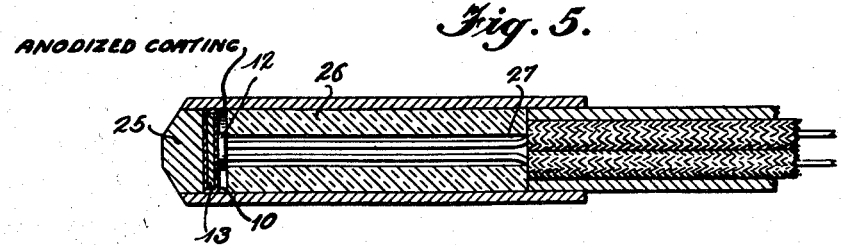
Inventor
Alvah I. Thompson
By George Lynn De Mott
Attorney Patented Aug. 1, 1950

2,517,053

UNITED STATES PATENT OFFICE 2,517,053

INSULATED THERMOCOUPLE UTILIZING AN ANODIZED SURFACE

Alvah I. Thompson, Ridgefield Park, N. J., assignor to The Bristol Company, Waterbury, Conn., a corporation of Connecticut Application July 10, 1945, Serial No. 604,115

8 Claims. (Cl. 136—4)

This invention relates to thermocouples as they are employed in the measurement of temperature or for control purposes. More particularly, the invention relates to the structure of the hot junction of thermocouples of the type employed as insertion thermometers in the cylinder heads or walls of internal combustion engines where conditions of measurement require the couples to be electrically insulated from the source to be measured.

The problem is particularly acute under the above conditions because the engine cylinders are subjected to rapid and extreme variations in temperature, and if continuous records of these temperature variations are to be obtained, or if controls dependent upon those variations are to be effective, it is essential that the thermocouples possess not only a minimum of mass contributing to thermal inertia, but also that the sensitive junction shall be in intimate thermal association with the source the temperature of which is to be measured, or which serves as a basis for control. The present invention is concerned particularly with a thermocouple designed for use under the conditions outlined and embodying the highly incompatible characteristics of high thermal conductivity with low electrical conductivity.

The problem with which the present invention is concerned has had many attempted solutions, but these solutions have been unsatisfactory because they have failed to provide adequate electrical insulation without undue increase in thermal inertia. Where the couple is in electrical contact with the mass the characteristics of which are under measurement, so as to require for operativeness that the circuits under control be isolated from ground or the frame of the engine or machine carrying the metal mass, it has sometimes been possible to make the system operative leaving the thermocouple permanently grounded, but this arrangement has been a prolific source of trouble. Under conditions, however, where this grounding of the circuit is not tolerable, as in aircraft installations where the electrical supply source is normally grounded to the metal structure or body of the engine, and where the power for operating self-balancing or controlling instruments, servo-motors, and the like, is derived from the same electrical source, the problem becomes especially acute. Prior attempts at its solution have almost uniformly introduced high thermal insulation proportionately with the increase in electrical insulation, either by the use of undue thickness of insulating material which possesses substantial heat insulating value or by the introduction of air spaces which have the same undesirable results.

The present invention is concerned with the problem of producing a thermocouple having high insulating value with very good heat conductivity so as to correlate these mutually incompatible characteristics in a thermocouple of high mechanical strength, minimum mass and thermal inertia, and unchanging characteristics when repairs or adjustments require removal or replacement of the couple.

Other objects will appear from the following description when read in conjunction with the accompanying drawings in which Figure 1 is a central sectional view of one form of thermocouple structure embodying the present invention, and utilizing two anodized elements in conjunction with the couple.

Figure 2 is a section on line 2—2 of Figure 1.

Figure 3 is a central sectional view of a modification in which an anodized metal disk is used in conjunction with a non-anodized metal cap.

Figure 4 is a view similar to Figure 3 of a modification in which an anodized metal plug is used without the anodized disk shown in Figures 1 and 3.

Figure 5 is a view, partly in section, of another modification in which a non-anodized plug is used with an anodized disk.

Referring now to Figure 1 of the drawings, reference character 6 identifies a ceramic bead of the usual type employed in thermocouple structures and containing two longitudinal conduits 7 and 8 through which pass the thermocouple wires 9 and 11, joined at 12 to form a thermal junction. The wires 9 and 11 are preferably of iron and constantan, respectively, although any other two dissimilar metals having thermocouple characteristics may be employed. The junction 12 is formed by twisting the wires together and then silver soldering them or welding them to form a composite metallic mass, the forward face of which is ground off flat for engagement with the anodized face 10 of a metal disk 13. The term "anodized" is intended to cover a thin insulating oxide film produced by methods well known in the art. It consists, in the case of aluminum, principally of aluminum oxide which gives it its electrically insulating characteristics without appreciably affecting its thermal characteristics. Several methods of obtaining an insulating deposit of this type are known, and need not be described. This type of coating may be applied to such metals as aluminum, magnesium and the like. The term "anodized" is, therefore, used to cover a coating applied to any metal when the characteristics described herein are produced and is indicated in the drawings by the reference character 10.

After the disk 13 is put in place, a cap 14 of anodized metal such as aluminum is forced over the reduced portion 16 of a sleeve 17 of material such as stainless steel which encloses the ceramic bead and extends up to the supporting sleeve 18. While it is the anodized layer 10 on the disk 13 adjacent the junction 12 that brings about the desirable characteristics of this invention, it is preferable to anodize the outside surface of the cap 14 to prevent oxidation and corrosion of the same.

It will be evident from Figure 1 that this structure presents ideal characteristics for efficiency of heat transfer through the small section of metal 14 and the disk 13 to the junction 12. At the same time the anodized film on the disk 13 as well as the film on the cap 14 offers very high electrical resistance to the flow of electric current from the junction to any grounded portion of the cap, and insures complete freedom from disturbance of the thermocouple circuit by transient or other currents caused by such grounding.

In Figure 3 there is shown a preferred construction with the parts the same as those described in connection with the form of Figure 1 except that the cap 19 is of any non-anodized metal, preferably metal of high thermal conductivity, such as silver. Here the thermal conduction takes place through the anodized metal disk 13 as in Figure 1, and the anodized coating 10 on this disk affords the necessary electrical resistance without imparting appreciable thermal resistance.

It is well known in the art that aluminum oxide has good dielectric strength. Now, since this anodized coating is either an aluminum monohydrate ($Al_2O_3.H_2O$) or amorphous aluminum oxide ($Al_2O_3$), depending upon whether the coating has or has not been sealed, it follows that this coating also has high dielectric strength. The dielectric constant is sometimes as high as 8, depending upon the thickness of the coating. Since it is a good dielectric, it follows that it is a poor thermal conductor. However, since the thickness of the coating required for this application is so thin (0.1 to 1.0 mil.) and has such a high degree of affinity for the parent metal, the resistance to heat transfer through the disk is reduced to negligible proportion. Unlike other metallic oxides, iron oxide, for example, this coating does not grow.

Under certain conditions it may be found desirable to simplify the structure by eliminating the anodized disk 13 and using an enclosing member of anodized metal alone. Such a simplified arrangement is shown in Figure 4. In this figure the ceramic bead 6 is constructed as in Figures 1 and 3 with a similar thermal junction 12. Here, however, the stainless steel tube 21 which houses the thermocouple leads and the ceramic bead is closed at its forward end by a metal plug 22 having its entire exterior surface anodized; the inside face contacting the junction 12 to give good thermal conductivity and high electrical resistance, while the exterior anodized surface 10 prevents corrosion of the exposed metal. For simplicity of assembly and manufacture, this plug may contain an annular groove 23 into which the forward end 24 of the tube 21 is rolled, or it can be press fitted with the groove omitted.

Figure 5 shows another embodiment in which a metal plug 25 is used in conjunction with an anodized disk 13. Here the bead 26 contains a single duct 27 to carry the wires 9 and 11 leading to the couple 12. In this form the plug 25 is preferably of silver and the disk 13 of aluminum. It will be obvious that functionally the plug 25 is the equivalent of the cap 19.

It will be apparent from the above description that the precise structure of the thermocouple may embody numerous variations, the essential feature being that the mass of metal between the thermal junction 12 and the material to be sensed shall have very low thermal inertia, so as to offer very little resistance to the rapid and efficient flow of heat to the junction, but imparting high electrical resistance to that path of flow. This combination is served admirably by the use of an anodized member of aluminum or the like interposed between the junction and the exterior of the couple structure. While it is known that anodized metals such as aluminum and magnesium have the characteristics of serving as a dielectric, it has never been suggested that they could be embodied in a thermocouple structure so as to correlate effectively and efficiently the highly incompatible characteristics of high thermal conductivity and low electrical conductivity as described in this specification.

Extensive tests have substantiated the fact that the structure above described accomplishes the results set forth. When a couple of the structure herein described is compared with standard couples under conditions where electrical insulation is not a factor, it has been found that no perceptible lag in reading due to the anodized coating can be detected. These tests have covered the usual range of indication; namely, from room temperature to 700° F. and back to room temperature. The insulating coatings were found during these tests to be fully effective under voltage as high as 30 volts direct current.

It is to be understood that although there has been illustrated only a structure of the single couple type, the invention is equally applicable to multiple thermocouples without any change in principle. The subjunctions may or may not be electrically insulated from each other, depending upon the detailed needs of the measuring circuit. In other words, each thermocouple hot junction may be individually insulated from the tip or the thermocouples may be joined in a common hot junction and collectively insulated from the tip and not from each other. While actually the dielectric or insulating film on the metal is microscopic in thickness, it has been exaggerated in the drawing in order to assist in the understanding of the invention.

Reference has been made in this specification to the use of anodized aluminum and magnesium, but the invention is not limited to these metals and their oxides. It applies equally to other metals having good thermal conductivity and on which adherent electrically insulating films may be formed, and the following claims are to be construed as covering such equivalents.

Having thus described my invention, what is claimed is:

1. A thermocouple structure including a thermojunction and a mass of metal responsive to temperature variations to be measured, said mass being in physical contact with said thermojunction and an anodized surface on said mass serving to insulate said junction against the flow of electricity between said junction and said metal, while permitting substantially unobstructed heat flow along the same path.

2. A thermocouple structure comprising a tubular support having a thermal junction disposed adjacent one end thereof; and means comprising an anodized metal member disposed at the open end of said tube adjacent to said junction, the anodized surface abutting said junction to insulate it electrically against flow of current between said member and said junction but permitting substantially unobstructed heat flow over the same path.

3. A thermocouple structure comprising a tube supporting a pair of wires of dissimilar metals joined adjacent one end of said tube to form a thermal junction; a metal disk disposed between said tube end and said junction and having a thin insulating film consisting essentially of metallic oxide on one face and abutting said junction; and a metal cap enclosing said tube end and engaging said disk to form a continuous heat conducting path between said cap and said junction but acting through said film to insulate said junction electrically against flow of current between said junction and the exterior of said cap.

4. A thermocouple structure comprising a pair of dissimilar metals joined together to form a thermojunction; an insulating support for said junction, and means for enclosing said junction and comprising a metal member having formed thereon and integral therewith an insulating film of great sectional area relative to its thickness, said film being disposed between said member and junction respectively and in physical contact with said junction, so as to provide electrical insulation, while permitting substantially unobstructed heat exchange, between the same.

5. A thermocouple structure comprising a tubular support having a thermal junction disposed therein; a metal disk having an anodized surface engaging said junction, the other face of the disk being disposed at the terminal end of said support; and an anodized metal cap fitted over the end of said support in close thermally conducting relation to said disk and said junction.

6. A thermocouple structure comprising a tubular support having a thermal junction disposed at one end thereof; an anodized metal disk disposed in said tube end with the anodized surface closely abutting said junction; and a silver cap fitted over said tube end with its inner face abutting the exposed face of said disk and in close thermally conducting relation to said disk and said junction.

7. A thermocouple structure comprising a tubular support containing a pair of thermocouple wires terminating adjacent one end of said support in a thermal junction of the two wires, said junction having an exposed flat face; a metal disk disposed in the end of said tube with one of its faces abutting the flat face of said junction; a thin anodized coating of electrically insulating material on the face of the disk which contacts said junction, said coating having the characteristic of low electrical conductivity with high thermal conductivity; and a metal enclosing cap fitted over the end of said tube and abutting said disk to provide a low resistance heat flow path between said cap and said junction.

8. A thermocouple structure comprising a thermal junction; a tubular support for said junction; and a metal closing means for the end of said support adjacent said junction, said means having good thermal conductivity and including an electrically insulating anodized coating interposed between said closing means and said junction and abutting said junction.

ALVAH I. THOMPSON.

REFERENCES CITED

The following references are of record in the file of this patent:

UNITED STATES PATENTS

| Number | Name | Date |
|---|---|---|
| 999,749 | Chubb | Aug. 8, 1911 |
| 1,752,117 | Smith | Mar. 25, 1930 |
| 2,149,448 | Lederer | Mar. 7, 1939 |
| 2,303,687 | Engholdt | Dec. 1, 1942 |
| 2,318,479 | Gillis | May 4, 1943 |
| 2,330,018 | Van Wert | Sept. 21, 1943 |

OTHER REFERENCES

Ruder, W. E., Trans. Electrochemical Socy., vol. 27 (1915), page 265.

Taylor, G. F., J. Ind. and Eng. Chem., Aug. 1920, page 797.

Spear et al., J. Ind. and Eng. Chem., Aug. 1923, page 844.

Roeser et al., J. Research, Bur. Stds., vol. 5 (1930), page 795.